United States Patent
Yu

(10) Patent No.: US 7,338,206 B2
(45) Date of Patent: Mar. 4, 2008

(54) DUAL-USE THERMOMETER

(75) Inventor: Chu-Yih Yu, Taipei Hsien (TW)

(73) Assignee: Mesure Technology Co., Ltd., San Chung, Taipei Hsien (TW)

( * ) Notice: Subject to any disclaimer, the term of this patent is extended or adjusted under 35 U.S.C. 154(b) by 122 days.

(21) Appl. No.: 11/194,259

(22) Filed: Aug. 1, 2005

(65) Prior Publication Data

US 2006/0052677 A1  Mar. 9, 2006

(30) Foreign Application Priority Data

Aug. 2, 2004  (TW) ............... 93212363 U
Sep. 10, 2004  (TW) ............... 93214425 U

(51) Int. Cl.
*G01K 1/00* (2006.01)
*G01J 5/00* (2006.01)

(52) U.S. Cl. ............... 374/208; 374/121; 600/474

(58) Field of Classification Search ............... 374/209, 374/158, 208, 130, 121; 600/474
See application file for complete search history.

(56) References Cited

U.S. PATENT DOCUMENTS

| | | | | |
|---|---|---|---|---|
| 4,863,281 A * | 9/1989 | Suszynski | ................... | 374/158 |
| 4,993,424 A * | 2/1991 | Suszynski et al. | .......... | 600/549 |
| 5,833,367 A * | 11/1998 | Cheslock et al. | ........... | 374/158 |
| 6,786,636 B1 * | 9/2004 | Huang et al. | ................ | 374/158 |
| 2004/0047392 A1 | 3/2004 | Wu et al. | | |
| 2004/0095985 A1 | 5/2004 | Ko et al. | | |

* cited by examiner

*Primary Examiner*—Gail Verbitsky
*Assistant Examiner*—Mirellys Jagan
(74) *Attorney, Agent, or Firm*—Thomas, Kayden, Horstemeyer & Risley

(57) ABSTRACT

A dual-use thermometer including a main body and a probe secured thereto for receiving heat radiation emitted from a first area and a second area. A non-detachable cap which is secured to the main body and the probe are movable relative to each other, thereby allowing the non-detachable cap to surround the probe for receiving heat radiation emitted from the first area and reveal the probe for receiving heat radiation emitted from the second area by movement of the non-detachable cap or the probe.

8 Claims, 7 Drawing Sheets

DUAL-USE THERMOMETER

BACKGROUND OF THE INVENTION

1. Field of the Invention

The invention relates to the field of thermometers. More particularly, the invention relates to the field of dual-use thermometers.

2. Description of the Related Art

As disclosed in U.S. publication No. 2004/0047392 A1 and 2004/0095985 A1, infrared thermometer offers a dual-use mode that can be used for both forehead and ear temperature measurements.

However, a cap adapted to isolate other heat radiation interference is easy to get lost since the cap is detachable from a main body of the thermometer.

SUMMARY OF THE INVENTION

Accordingly, an embodiment of the invention provides a dual-use thermometer for measuring a first area and a second area, comprising: a main body; a probe, secured to the main body, for receiving heat radiation emitted from the first area and the second area; a non-detachable cap, secured to the main body, wherein the non-detachable cap and the probe are movable relative to each other, thereby allowing the non-detachable cap to surround the probe for receiving heat radiation emitted from the first area and reveal the probe for receiving heat radiation emitted from the second area by movement of the non-detachable cap or the probe.

Another embodiment of the invention provides a dual-use thermometer for measuring a first area and a second area, comprising: a main body, comprising a front end stop portion, a rear end stop portion, and a recess portion therebetween; a probe, secured to the main body, for receiving heat radiation emitted from the first area and the second area; a slidable cap, disposed on the recess portion, operative to surround the probe for receiving heat radiation emitted from the first area and reveal the probe for receiving heat radiation emitted from the second area by movement of the slidable cap toward the front end stop portion and the rear end stop portion respectfully.

Another embodiment of the invention provides a dual-use thermometer for measuring a first area and a second area, comprising: a main body; a hollow cap with a chamber therein, secured to the main body; a rotary control, disposed between the main body and the hollow cap; a threaded sleeve with an inner thread, secured to the rotary control in the chamber; a probe with an outer thread engaging the inner thread, surrounded by the threaded sleeve; wherein the probe is operative to be introduced into the chamber by rotating the rotary control in a first direction for receiving heat radiation emitted from the first area, and pushed out of the hollow cap by rotating the rotary control in a second direction for receiving heat radiation emitted from the second area.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE INVENTION

The invention provides a main body and a probe secured to the main body for receiving heat radiation emitted from a first area and a second area. A non-detachable cap which is secured to the main body and the probe are movable relative to each other, thereby allowing the non-detachable cap to surround the probe for receiving heat radiation emitted from the first area and reveal the probe for receiving heat radiation emitted from the second area by movement of the non-detachable cap or the probe.

Figure 1:
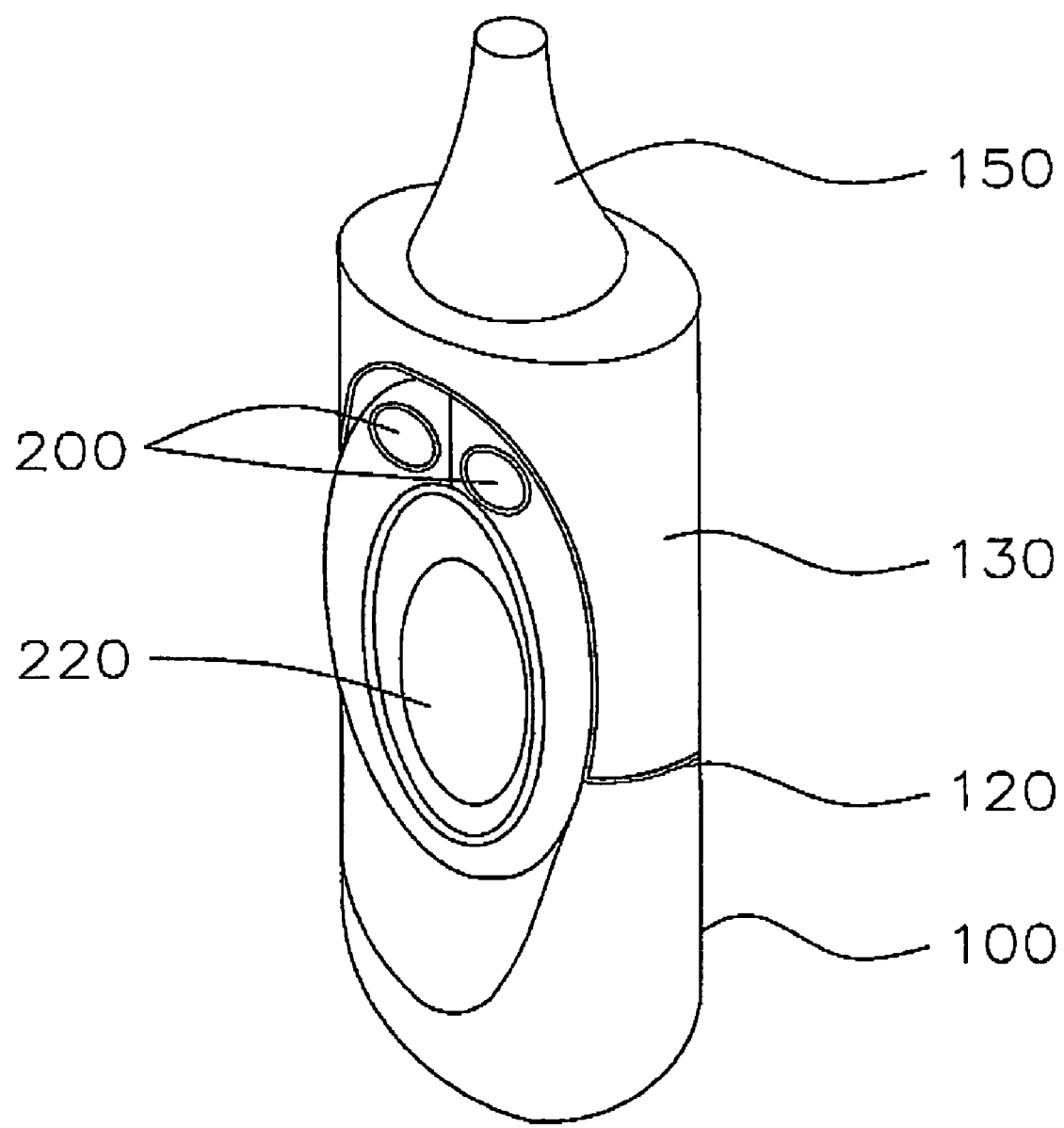
FIG. 1 is a perspective schematic diagram showing a thermometer of an embodiment.
Figure 2:
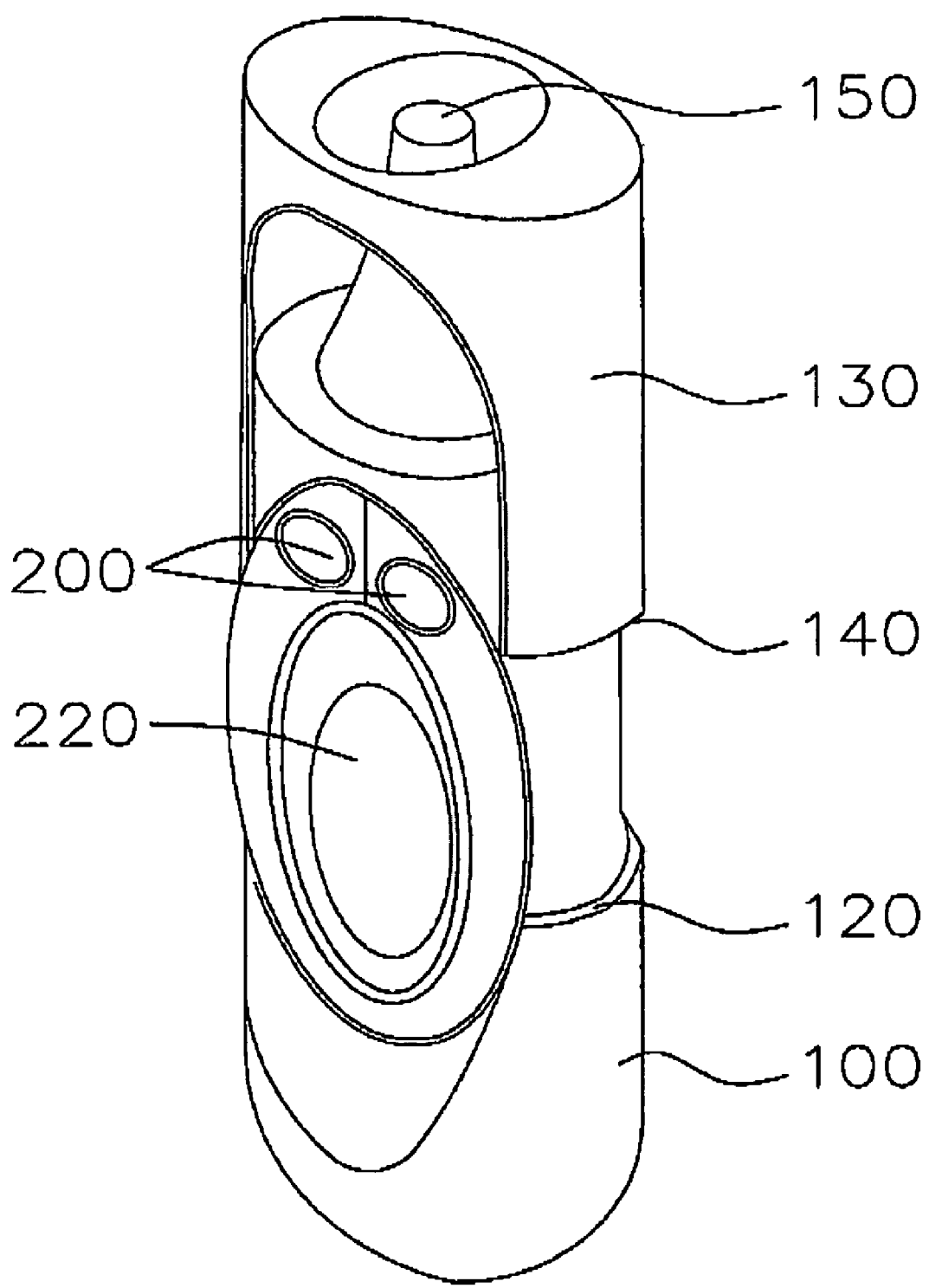
FIG. 2 is a perspective schematic diagram showing a thermometer of an embodiment after a probe has been surrounded by a slidable cap.

Referring to FIGS. 1 and 2, a dual-use thermometer of an embodiment is illustrated. The dual-use thermometer comprises a main body 100 and a probe 150 secured thereto. In general, the probe 150 is operative to receive heat radiation emitted from a first area and a second area. And the main body 100 may typically comprise a front end stop portion 140, a rear end stop portion 120, and a recess portion therebetween.

In addition, a slidable cap 130 is disposed on the recess portion, which may be operative to surround the probe 150 for receiving heat radiation emitted from the first area and reveal the probe 150 for receiving heat radiation emitted from the second area, by movement of the slidable cap 130 toward the front end stop portion 140 and the rear end stop portion 120 respectfully. Preferably, the slidable cap 130 is stopped at the front end stop portion 140 or the rear end stop portion 120.

In one example, the thermometer may be an ear infrared thermometer. Generally, the probe 150 with a transparent window (not shown) has the geometry suitable for being disposed in a human ear. The heat radiation emitted from the human ear is transmitted into the sensor (not shown) installed in the probe via the transparent window. The technique for the probe is known to the art.

In another example, the first area comprises a body cavity such as an ear canal, thereby allowing the probe 150 to be introduced thereinto. Furthermore, the second area may comprise a flat surface such as a human forehead, thereby allowing the slidable cap 130 to be in contact therewith.

Also referring to FIG. 2, the slidable cap 130 may comprise an opening on its top surface, thereby allowing the probe 150 to pass through the opening.

On the other hand, an operating portion disposed on one side of the main body may comprise a liquid crystal display 220 and button switch 200. By switching on one of the buttons, the power supply is provided. By activating a measuring key, the temperature is measured and displayed on the liquid crystal display 220.

However, the slidable cap 130 may cover the operating portion when it is moved to the rear stop end portion 120.

For exposing the operating portion of the main body 100, the slidable cap 130 may further comprise an opening on its side surface.

Figure 3:
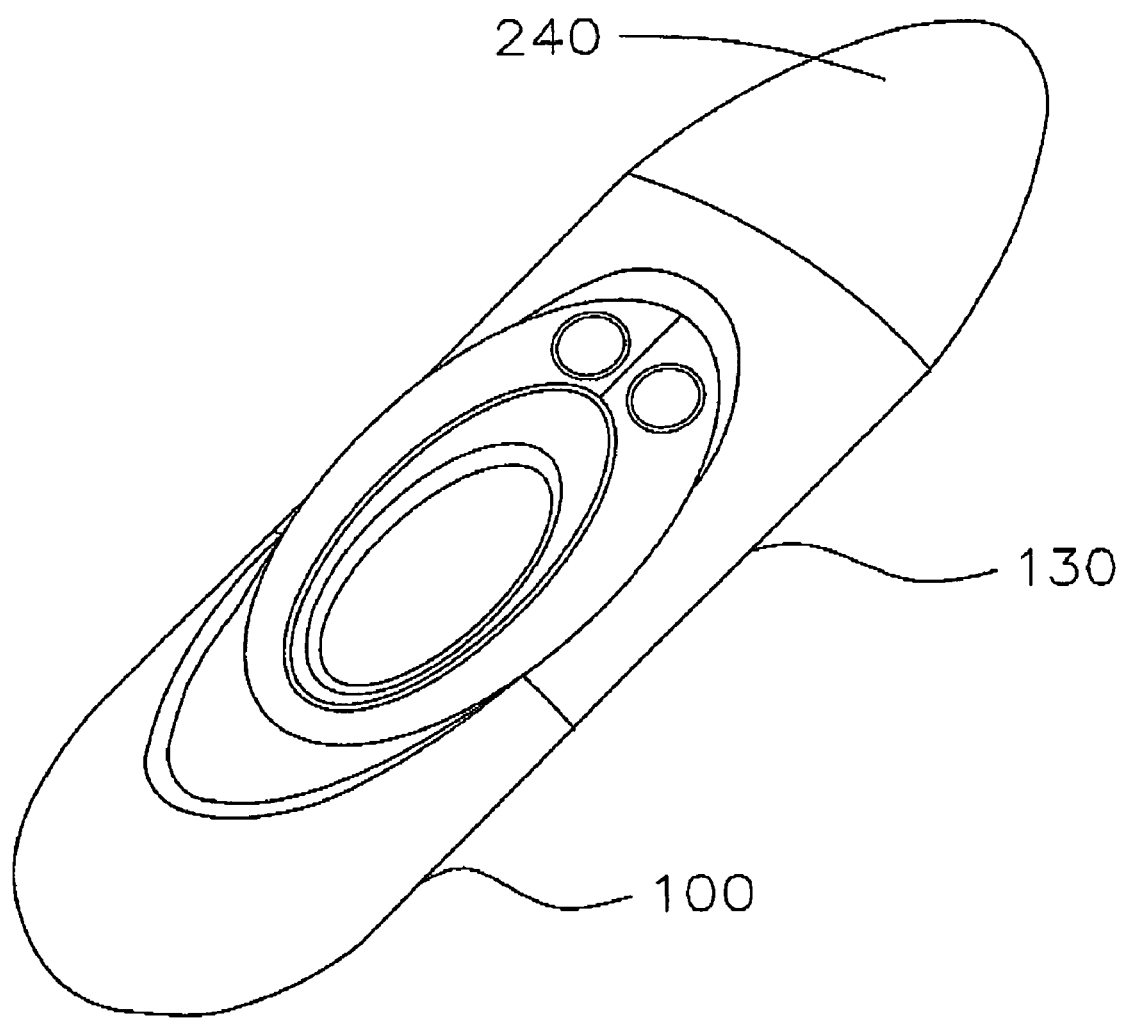
FIG. 3 is a perspective schematic diagram showing a thermometer of an embodiment after a probe has been covered with a protective cover.

Referring now to FIG. 3, the thermometer preferably comprises a protective cover 240 provided to cover the probe 150 when the slidable cap 130 is stopped at the rear end stop portion 120.

Figure 4:
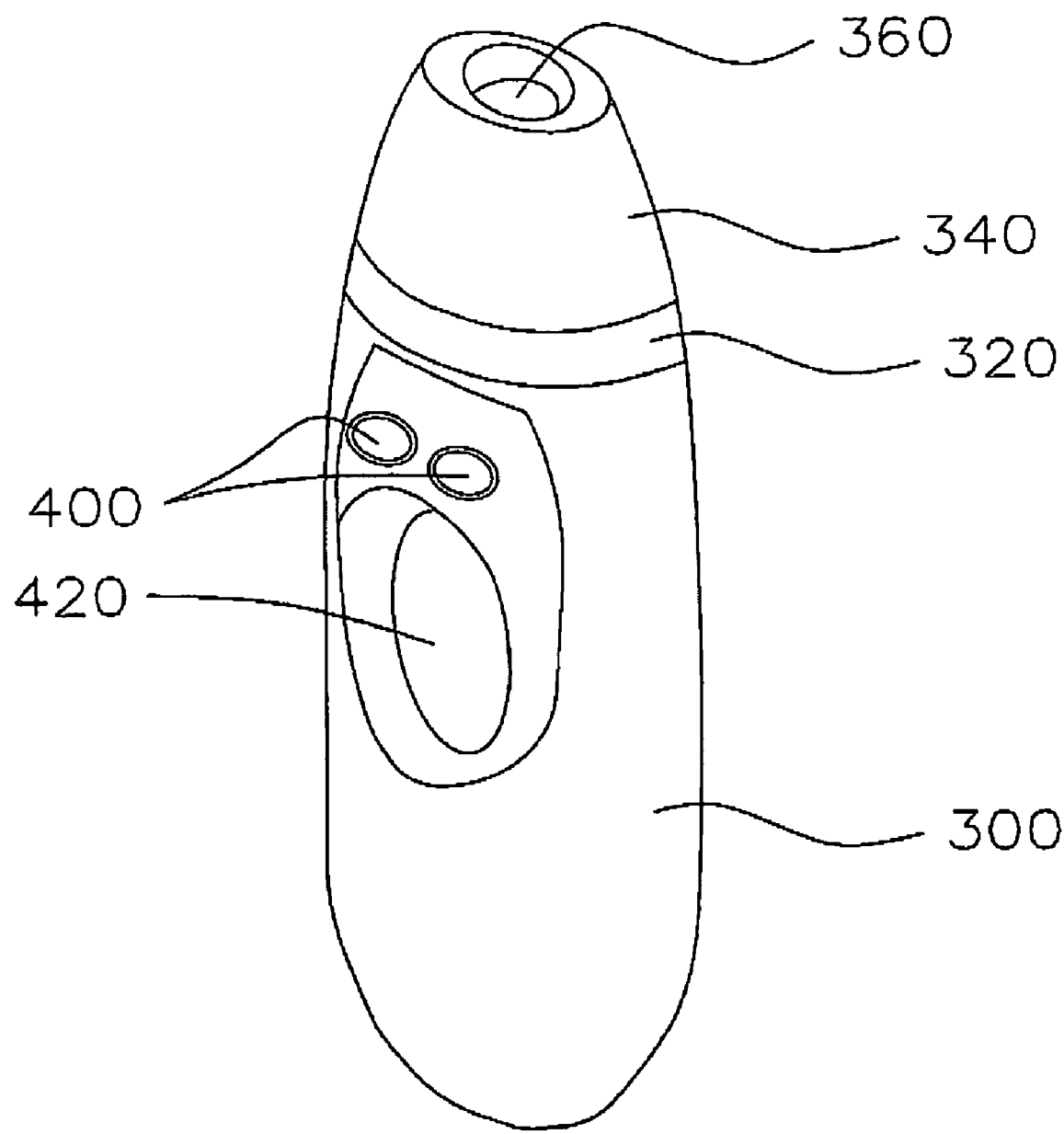
FIG. 4 is a perspective schematic diagram showing a thermometer of an embodiment.
Figure 5:
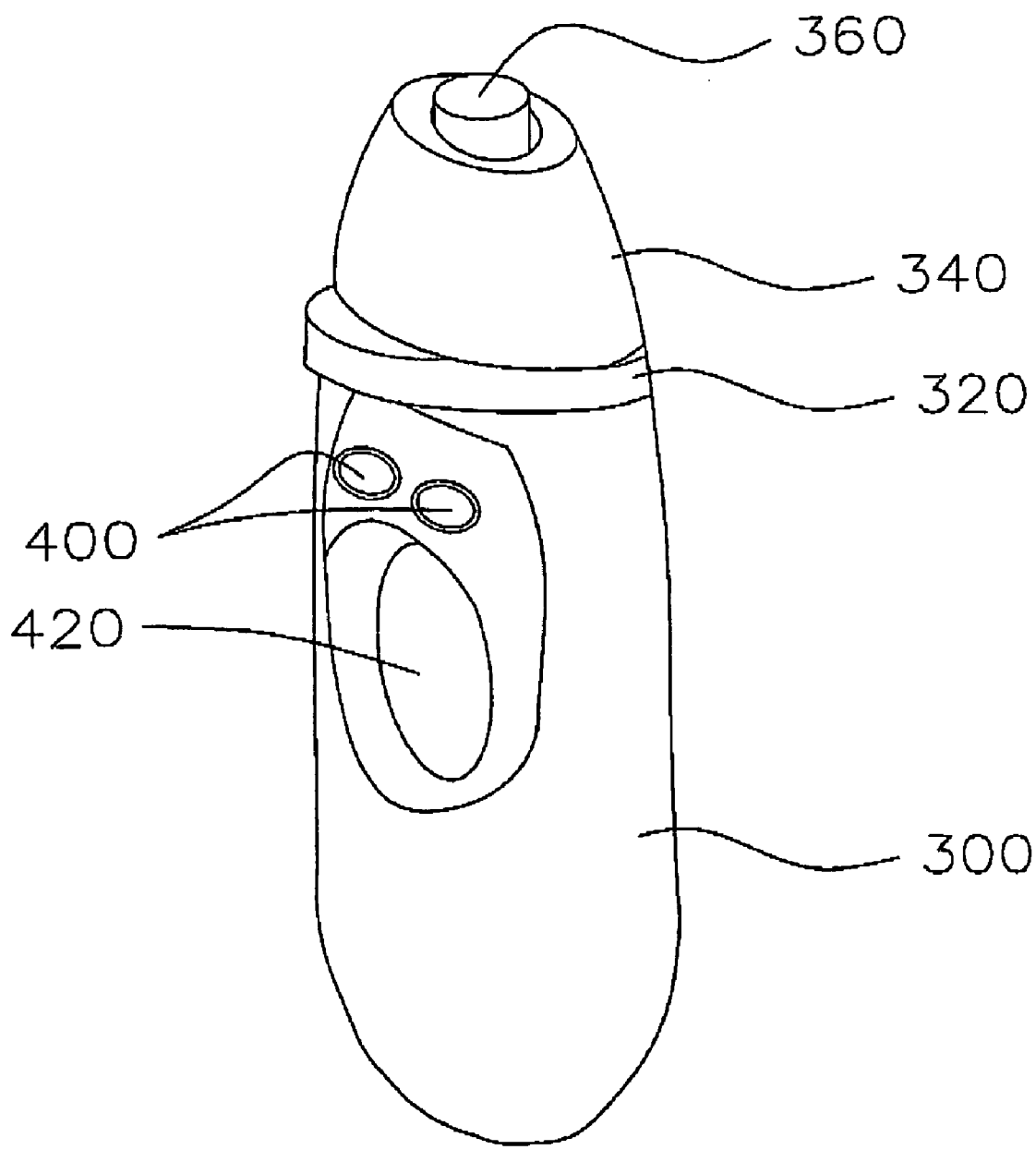
FIG. 5 is a perspective schematic diagram showing a thermometer of an embodiment after a rotary control has been rotated along a direction.
Figure 6:
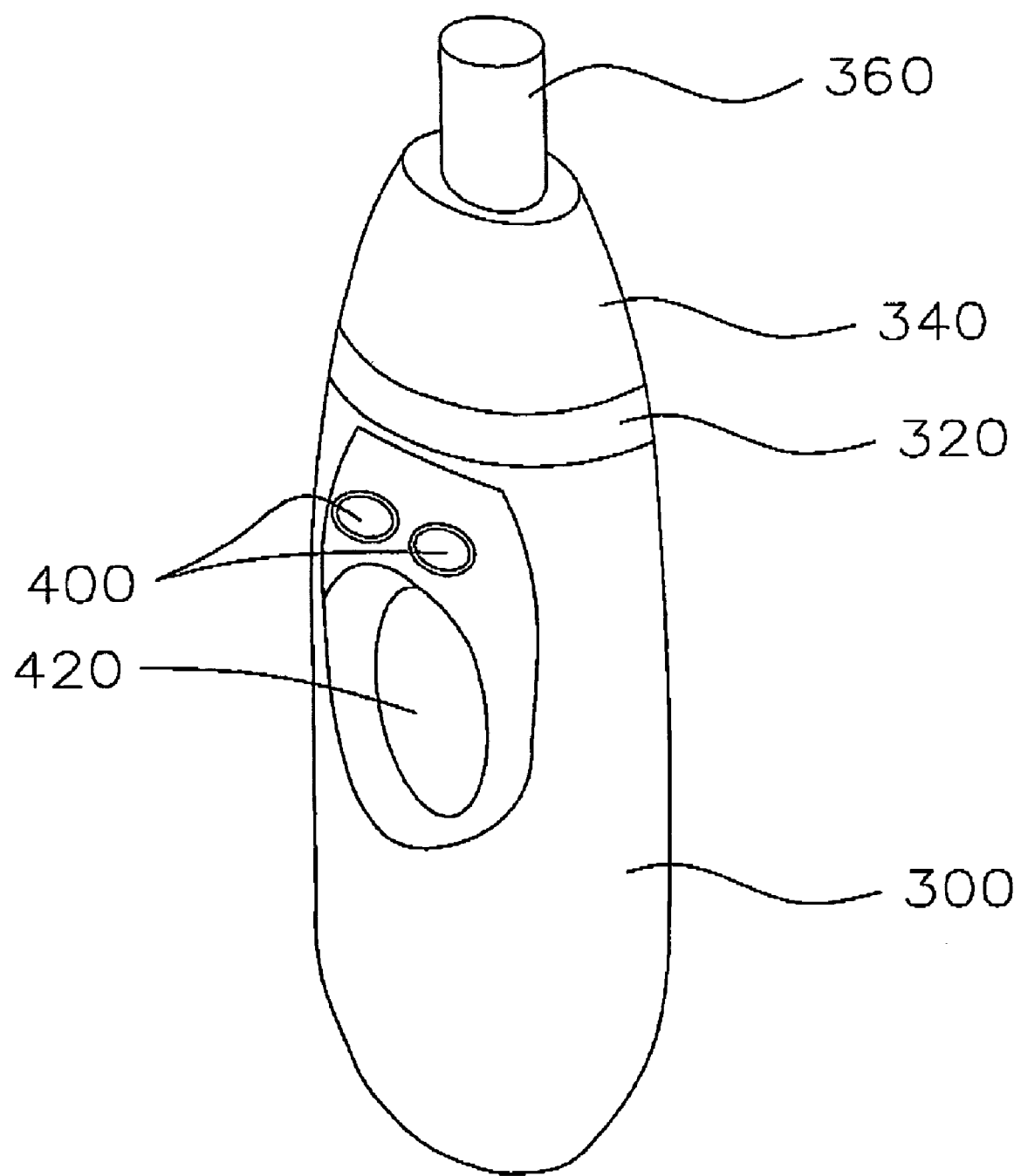
FIG. 6 is a perspective schematic diagram showing a thermometer of an embodiment after a probe has been pushed out of a non-detachable cap.

Referring to FIGS. 4, 5 and 6, a dual-use thermometer of an embodiment is illustrated. The dual-use thermometer comprises a main body 300 and a probe 360 secured thereto. In general, the probe 360 is operative to receive heat radiation emitted from a first area and a second area.

Alternatively, a hollow cap 340 with a chamber therein is secured to the main body 300, and a rotary control 320 is disposed between the main body 300 and the hollow cap 340.

Figure 7:
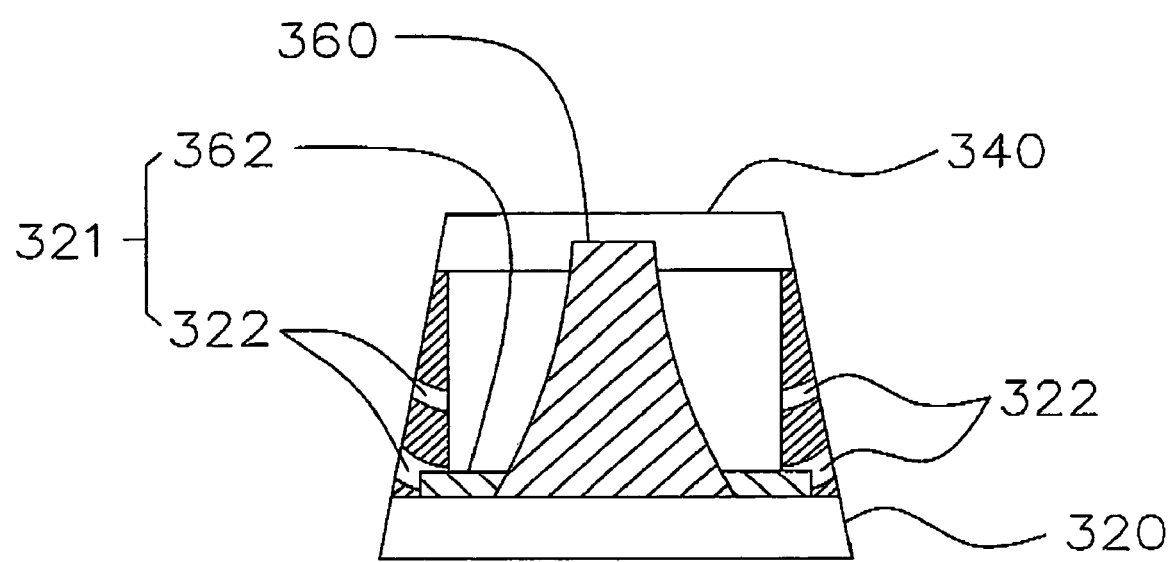
FIG. 7 is a cross-sectional view of an embodiment of a probe surrounded by a cap.

In addition, referring to FIG. 7, a threaded sleeve 321 with an inner thread 322 may be secured to the rotary control 320 in the chamber. On the other hand, the probe surrounded by the threaded sleeve 321 may comprise an outer thread 362 for engaging the inner thread 322.

In the above-described embodiments, the probe 360 is preferably operative to be introduced into the chamber by rotating the rotary control 320 along a first direction such as a clockwise direction for receiving heat radiation emitted from the first area, and pushed out of the hollow cap by rotating the rotary control along a second direction opposite the first direction such as a counterclockwise direction for receiving heat radiation emitted from the second area.

In another example, the first area comprises a body cavity such as an ear canal, thereby allowing the probe 360 to be introduced thereinto. Furthermore, the second area may comprise a flat surface such as a human forehead, thereby allowing the cap 340 to be in contact therewith.

Typically, the hollow cap 340 comprises an opening on its top surface and the chamber is extended from the opening, thereby allowing the probe 360 to be pushed out of the hollow cap 340 through the opening.

While the invention has been described by way of example and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A dual-use thermometer for measuring a first area and a second area, comprising:
   a main body;
   a hollow cap with a chamber therein, secured to the main body;
   a rotary control, disposed between the main body and the hollow cap;
   a threaded sleeve in the chamber, secured to the rotary control; and
   a probe engaging the threaded sleeve;
   wherein the probe is operative to be introduced into the chamber by rotating the rotary control in a first direction for receiving heat radiation emitted from the first area, and pushed out of the hollow cap by rotating the rotary control in a second direction for receiving heat radiation emitted from the second area.

2. The thermometer as recited in claim 1, wherein the hollow cap comprises an opening on its top surface and the chamber is extended from the opening, thereby allowing the probe to be pushed out of the hollow cap through the opening.

3. The thermometer as recited in claim 1, wherein the thermometer comprises an infrared radiation thermometer.

4. The thermometer as recited in claim 1, wherein the threaded sleeve comprises an inner thread and the probe comprises an outer thread engaging the inner thread.

5. The thermometer as recited in claim 1, wherein the first area comprises a flat surface, thereby allowing the hollow cap to be in contact therewith.

6. The thermometer as recited in claim 5, wherein the flat surface comprises a human forehead.

7. The thermometer as recited in claim 1, wherein the second area comprises a body cavity, thereby allowing the probe to be introduced thereinto.

8. The thermometer as recited in claim 7, wherein the body cavity comprises an ear canal.

\* \* \* \* \*